United States Patent Office 3,635,972
Patented Jan. 18, 1972

3,635,972
3-METHYL-2-QUINOXALINECARBOXAMIDE-DI-N-OXIDES
Timothy H. Cronin, Niantic, Conn., assignor to
Pfizer Inc., New York, N.Y.
No Drawing. Filed July 22, 1969, Ser. No. 843,810
Int. Cl. C07d 51/78
U.S. Cl. 260—250 R                                                 6 Claims

ABSTRACT OF THE DISCLOSURE

Novel 3-methyl-2-quinoxalinecarboxamide-di-N-oxides wherein the carboxamide group is represented by —CON-($R_1$)-alkylene-Z wherein Z is lower alkanoylamino, mono-, or di(lower alkyl)amino, hydroxy, lower alkoxy, lower alkanoyloxy, carboxy, carbo(lower)alkoxy or carbamyl and $R_1$ is hydrogen or methyl are described. The products are useful as bactericides.

BACKGROUND OF THE INVENTION

This invention relates to novel N-substituted 3-methyl-2-quinoxalinecarboxamide-di-N-oxide derivatives which are useful antibacterial agents for the control of various pathogenic micro-organisms.

The extensive and intensive search for antibacterial agents has led to the development of a wide variety of structural types of organic compounds, including derivatives of 2 - quinoxalinecarboxamide - di - N - oxides and 3-methyl-2-quinoxalinecarboxamide-di-N-oxides.

Landquist et al., J. Chem. Soc. 2052 (1956) reported the preparation of 3-methyl-2-quinoxalinecarboxamide-di-N-oxide and 3-methyl-2-quinoxalinehydroxamic acid-di-N-oxide in a search for compounds of improved antibacterial or antiprotozoal activity. However, no utility is alleged for either of these compounds.

Netherlands specification 6504563, granted Oct. 18, 1965, reports a series of N-substituted derivatives of 2-quinoxalinecarboxamide-di-N-oxide in which the substituent is an N,N-dialkylaminoalkyl group; e.g., N,N-dimethylaminoethyl-, N,N-diethylaminoethyl-, N,N-diethylaminopropyl-, N,N-dimethylaminoisobutyl-, and N,N-diethylamino-t-amyl; or a hydroxyalkyl group; e.g., 2-hydroxyethyl. The compounds are described as active agents against cancer. French Patent M3717, granted Jan. 3, 1966, generically discloses 2-quinoxalinecarboxamide-di-N-oxides in which the carboxamide group may be substituted with an alkyl, substituted alkyl, aryl, cycloalkyl, aralkyl, or cycloalkylalkyl group; or may form a heterocyclic amide, e.g., a piperidide. They are reported to be of use in human therapy as antitubercular, antibacterial, anticancer, antivirus and antiprotozoal agents.

Belgian Pat. 697,976, granted November 3, 1967, describes a variety of N-substituted derivatives of 3-methyl-2-quinoxalinecarboxamide-di-N-oxide in which the N-substituent is phenyl, substituted phenyl, dodecyl or ethyl. Also disclosed are cyclic amides, e.g., pyrrolidide and piperidide. They are said to be of value as intermediates for the preparation of vegetation protection agents and pharmaceutical agents.

Belgian Pat. 721,724, published Apr. 2, 1969, describes a variety of N-substituted 3-methyl-2-quinoxalinecarboxamide-di-N-oxides wherein the N-substituent is a hydroxyalkyl, lower alkoxyalkyl, carbalkoxyalkyl, monoalkylaminoalkyl or di(alkyl)aminoalkyl group as antibacterial agents.

SUMMARY OF THE INVENTION

It has been found that a series of N-substituted 3-methyl-2-quinoxalinecarboxamide-di-N-oxides of Formula I exhibit antibacterial activity both in vitro and in vivo:

$$X-\underset{\underset{O}{\downarrow}}{\overset{\overset{O}{\uparrow}}{\bigotimes}}\underset{}{\overset{CH_3}{\underset{C-N-alkylene-Z}{\underset{\underset{O}{||}\;\;\underset{R_1}{|}}{}}}}$$

wherein

X is selected from the group consisting of hydrogen, chloro, fluoro, methyl and methoxy;
Y is selected from the group consisting of hydrogen, methyl and methoxy;
$R_1$ is selected from the group consisting of hydrogen, methyl and ethyl;
Z is selected from the group consisting of $-NR_2R_3$, $-OR_4$ and $$-\overset{O}{\overset{||}{C}}-R_5$$

wherein $R_2$ is selected from the group consisting of hydrogen, methyl and ethyl;
$R_3$ is selected from the group consisting of $R_2$ and lower alkanoyl, with the proviso that when $R_3$ is lower alkanoyl, $R_2$ is hydrogen;
$R_2$ and $R_3$ when taken together with the nitrogen atom to which they are attached form a nitrogen containing heterocyclic ring selected from the group consisting of pyrrolo, pyrrolidino, piperazino, piperidino, N-(lower alkyl)piperazino and morpholino;
$R_4$ is selected from the group consisting of hydrogen, lower alkyl and lower alkanoyl;
$R_5$ is selected from the group consisting of hydroxy, lower alkoxy and $-NR_6R_7$ wherein each of $R_6$ and $R_7$ is selected from the group consisting of hydrogen, methyl and ethyl; and
Alkylene is a divalent alkyl radical containing from 2 to 4 carbon atoms with the proviso that when Z is $$-\overset{O}{\overset{||}{C}}-R_5$$

alkylene is a divalent alkyl radical containing from 1 to 3 carbon atoms.

By the terms "(lower)alkyl," "lower alkanoyl," and "(lower)alkoxy" is meant those alkyl, alkanoyl and alkoxy groups containing from 1 to 4 carbon atoms since they are conveniently prepared from readily and economically available materials.

For convenience, the compounds of Formula I are subdivided into three groups—Formulae II–IV—on the basis of the value of the Z variable.

II
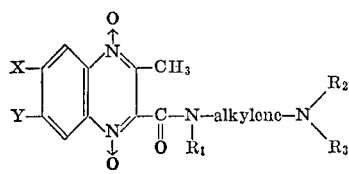

III
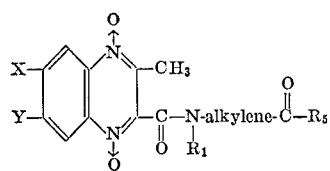

IV $$X-\underset{Y}{\underset{\downarrow}{\overset{\overset{O}{\uparrow}}{\underset{N}{\overset{N}{\bigotimes}}}}}\overset{CH_3}{\underset{C-N-\text{alkylene-}\overset{O}{\overset{\|}{C}}-R_5}{\bigg|}}$$
$$\underset{O}{\phantom{X}} \quad \overset{\phantom{O}}{O R_1}$$

Also included within this invention are the pharmaceutically-acceptable acid addition salts of the compounds of Formula II. Included among the non-toxic acid addition salts of the above-mentioned bases are the water soluble and water insoluble salts such as the hydrochloride, hydrobromide, phosphate, nitrate, sulfate, acetate, citrate, gluconate, benzoate, propionate, butyrate, sulphosalicylate, maleate, laurate, malate, fumarate, succinate, oxalate, tartrate, amsonate (4,4'-diiminostilbene-2,2'-disulfonate), pamoate (1,1' - methylene-bis-2-hydroxy-3-naphthoate), stearate, 2-hydroxy-3-naphthoate, hexafluorophosphate, toluene-p-sulfonate and suramin salt.

Many of the compounds of Formulae II and III above are effective broad spectrum antibacterials both in vitro and in vivo. Such broad spectrum activity is in contrast to the gram-negative activity exhibited by currently available quinoxaline-di-N-oxides. The prior art compounds which lack a 3-methyl group do not exhibit broad spectrum activity. Additionally, several of the compounds described herein are efficient animal growth promotants, particularly for swine and poultry.

The compounds of Formula IV wherein $R^5$ is hydroxy or lower alkoxy are primarily of value as intermediates for the production of compounds of Formula IV wherein $R_5$ is —$NR^6R^7$.

The substituents on the fused benzene moiety of the 3 - methyl - 2 - quinoxalinecarboxamide-di-N-oxide compound can vary widely. For example, at least one of the following substituents can be present: hydrogen, lower alkyl, lower alkoxy, chloro, bromo, fluoro, trifluoromethyl, di(lower alkyl) amino, amino, carboxy, carbamyl, carbo(lower alkoxy), lower alkylmercapto, lower alkylsulfoxy, lower alkylsulfonyl, sulfonamido, and N,N-di-(lower alkyl)sulfonamido. The favored positions on the fused benzene ring are the 6- and/or 7-positions. Of special interest for these positions are at least one of the following substituents: hydrogen, methyl, chloro, fluoro, and methoxy. A single substituent, that is, a 6- or 7-substituent, is usually favored over a 6,7-disubstituted derivative for reasons of economy as regards the reactants used. The preferred substituents are hydrogen, chloro and fluoro. Nitro, hydroxy and mercapto groups are not desirable substituents since they react with difficulty in the preferred process for making these novel compounds and/or formation of undesired products and poor yields.

The locations of the substituents X and Y illustrated herein is somewhat arbitrary since the exact points of attachment are not known. They may be at the 6,7-positions or the 7,6-positions.

Unique among the compounds of this invention by reason of their outstanding broad spectrum activity and/or significant growth promoting activity in swine are those compounds of Formula I wherein $R_1$ is hydrogen and the variables X (or Y) and -alkylene-Z have the following values:

| X (or Y) | —alkylene-Z |
|---|---|
| H | —$CH_2$—$CH_2$—$N(CH_3)_2$ |
| H | —$CH_2$—$CH$—$N(CH_3)_2$<br>　　　　$\|$<br>　　　$CH_3$ |
| Cl | —$CH_2$—$CH_2$—$N(CH_3)_2$ |
| F | —$CH_2$—$CH_2$—$N(CH_3)_2$ |
| Cl | —$CH_2$—$CH_2$—OH |
| Cl | —$CH_2$—$CH_2$—$OCH_3$ |

DETAILED DESCRIPTION OF THE INVENTION

The novel compounds of this invention can be prepared by several methods. The first method (method A) is the preferred one since it utilizes readily available materials, is simple and convenient and productive of good yields of the desired product. This reaction, in its broadest sense, comprises reacting the appropriate benzofuroxan with the desired amino containing reactant, e.g., $R_1$NH-alkylene-$NR_2R_3$, $R_1$NH-alkylene-O-$R_4$, $R_1$NH-alkylene-CO$R_5$, and diketene (ketene dimer) in at least equimolar proportions. In general, an excess of the amine reactant is used since the reaction with the benzofuroxan is most readily conducted in the presence of a base catalyst. For the instant process, an excess of the amine reactant, which is frequently the most readily available and most economical of the reactants used, conveniently serves as catalyst. The amount of excess amine used is not critical. It is, however, advantageous to use up to a 50 percent molar excess of the amine based on the diketene or benzofuroxan used, in order to insure complete reaction plus sufficient base to serve as catalyst. The use of a larger excess of amine appears to serve no useful purpose. Alternatively, a separate base which does not enter into the reaction except to serve as catalyst, can be used in place of excess of the amine reactant. The separate base can be a tertiary amine, ammonia, an alkali metal alkoxide, an alkali metal alkoxide, an alkali metal or alkaline earth metal hydroxide, or a metal hydride. Representative of such bases are 1,5-diazabicyclo[4.3.0] - 5 - nonene, triethylamine, 1,2-dimethyl-1,4,5,6-tetrahydropyrimidine, sodium methoxide, potassium ethoxide, alcoholic potassium hydroxide and sodium hydride. In such instances, as noted above, the amine reactant is used in approximately equimolar proportions to the diketene or benzofuroxan. The separate base is normally used up to one-half mole per mole of the diketene or benzofuroxan. Larger amounts of added base are of no apparent advantage. It can be added to the reaction mixture before, with or after the amine reactant, or with the benzofuroxan reactant.

The reaction is usually conducted in an appropriate solvent system, that is, a reaction-inert solvent or mixture of solvents, which serves to dissolve at least the reactants and which does not enter into adverse reactions with the reactants or products. Suitable solvents are ethers such as diethylether, diisopropylether, dioxane, tetrahydrofuran, dimethylethers of ethyleneglycol and diethyleneglycol; alcohols especially the lower molecular weight alcohols having up to four carbon atoms; N,N-dimethylformamide, benzene, toluene, xylene, acetonitrile, halogenated hydrocarbons such as chloroform, methylene chloride and mixtures of these solvents.

The reaction is normally conducted over the temperature range of from about 0° C. to about 100° C. Higher temperatures can be used but appear to offer no advantage and may in certain cases cause decomposition. The reaction period, as expected, depends upon the reactants and the temperature used. For a given set of reactants, the higher the reaction temperature, the shorter the reaction period; the lower the reaction temperature, the longer the reaction period.

The order of addition of reactants is not critical to the success of this process. The reaction can be conducted by simultaneous or stepwise addition of the various reactants including the excess amine or separate base as catalyst.

From a practical standpoint in order to achieve maximum yield of the desired 3-methyl-2-quinoxalinecarboxamide-di-N-oxide, it is advantageous to react the diketene and amine containing reactant together in an appropriate solvent system for a brief period before adding the benzofuroxan. A preferred method comprises adding a solution of the desired amine in a reaction-inert solvent to at least an equimolar solution of diketene in the same or other reaction-inert solvent which is miscible with the amine solvent at a temperature of from about 0° C. to about 30° C. The mixture is then treated immediately with the catalyst and benzofuroxan reactant by dissolving this last reactant into the amine-diketene reaction mixture. The temperature of this phase of the reaction is not critical but can range up to about 100° C. In most instances, the temperature of this phase is kept below about 60° C. and is frequently run at room temperature for periods of up to twenty-four hours. In most instances, the reaction mixture is allowed to stand at room temperature for several hours, e.g., overnight.

The reaction products frequently separate from the reaction mixture as solids, often crystalline solids, which are recovered by filtration or centrifugation and recrystallized, if desired, for further purification. The products, if not solids which separate upon standing, are recovered by precipitation from the reaction mixture by addition of a suitable solvent, more accurately, a non-solvent for the product. The precipitated product is then recovered as above. Alternatively, the product is recovered by evaporation of the solvent.

A second method (method B) broadly comprises reaction of a benzofuroxan with an appropriate N-substituted β-ketoamide, such as those of the formulae

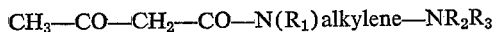
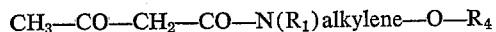
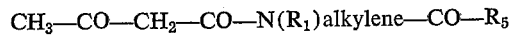

wherein the alkylene and R groups are as defined above, in the presence of a base catalyst. It is preferred to use a tertiary amine, e.g., triethylamine, as catalyst since they appear to accelerate the reaction relative to other bases. Primary and secondary amines and other bases such as described in method A can also be used as catalysts. The comments given above on method A as regards solvents, order of addition and ratio of reactants, temperature and product recovery also apply to this method. This method is not as generally applicable as is method A because of the non-availability of a wide variety of β-ketoamides.

Still another method (method C) involves the reaction of an ester of 3-methyl-2-quinoxalinecarboxylic acid-di-N-oxide; e.g., the ethyl ester, with the appropriate amino containing reactant, such as those indicated under method A above, in a suitable solvent. The reaction is conducted by mixing the ester with the amine reactant in a solvent such as methanol at a temperature of from about 20° C. to about the reflux temperature of the solvent for a period of from about one hour to several days. The reaction period is, of course, dependent upon the temperature for a given system. The reactants are mixed preferably in a 1:1 molar ratio although excesses of either reactant can be used. The products are isolated as described above for method A.

A further method comprises acylation of the appropriate amine containing reactant using as acylating agent the product of 3-methyl-2-quinoxalinecarboxylic acid-di-N-oxide and a carbodiimide, such as 1,3-dicyclohexylcarbodiimide, or N,N'-carbonyldiimidazole. The reaction is conducted at about ambient temperature by first reacting the acid reactant with the carbodiimide in a reaction-inert solvent such as the non-hydroxylic solvents enumerated above. The "activated" carboxylic acid is then reacted with the amine reactant and the product recovered by known methods. This procedure is not recommended for use with alkanolamines in order to avoid acylation at the hydroxy group of the alkanolamine.

Acid addition salts of compounds of Formula II are prepared by methods well-known to those skilled in the art. A convenient method comprises dissolving the free base in a suitable solvent, e.g., acetone, water, a lower aliphatic alcohol (ethanol, isopropanol) containing the desired acid, or to which the desired acid is subsequently added. The salts are recovered by filtration, precipitation with a non-solvent, by evaporation of the solvent or, in the case of aqueous solutions, by lyophilization. In this manner the sulphate, nitrate, phosphate, acetate, propionate, butyrate, citrate, gluconate, benzoate, pamoate, amsonate, the tartrate, 3-hydroxy-2-naphthoate and the sulphosalicylate and other salts can be prepared.

The valuable products of this invention are remarkably effective in treating a wide variety of pathogenic microorganisms. They are, therefore, useful as industrial antimicrobials, for example, in water treatment, slime-control, paint preservation and wood preservation as well as for topical application purposes as disinfectants.

For in vitro use, e.g., for topical application, it will often be convenient to compound the selected product with a pharmaceutically-acceptable carrier. Thus, for example, they may be blended with vegetable or mineral oils or incorporated in emollient creams. Similarly, they may be dissolved or dispersed in liquid carriers or solvents such as water, alcohol, glycols or mixtures thereof or other reaction-inert media, that is, media which have no harmful effect on the active ingredient. For such purposes, it will generally be acceptable to employ concentrations of active ingredients of from about 0.01 percent to about 10 percent by weight based on total composition.

Further, many of the compounds described herein exhibit broad spectrum activity, that is, activity against both gram-negative and gram-positive bacteria, in contrast to the usual gram-negative activity of quinoxaline-di-N-oxides. Additionally, many of them are active in vivo and are especially useful as animal growth promotants, especially swine and poultry.

When used for such purposes, these novel compounds can be administered orally or parenterally, e.g., by subcutaneous or intramuscular injection, at a dosage of from about 1 mg./kg. to about 100 mg./kg. of body weight. Vehicles suitable for parenteral injection may be either aqueous such as water, isotonic saline, isotonic dextrose, Ringer's solution, or non-aqueous such as fatty oils of vegetable origin (cotton seed, peanut oil, corn, sesame), dimethylsulfoxide and other non-aqueous vehicles which will not interfere with therapeutic efficiency of the preparation and are non-toxic in the volume or proportion used (glycerol, propylene glycol, sorbitol). Additionally, compositions suitable for extemporaneous preparation of solutions prior to administration may advantageously be made. Such compositions may include liquid diluents, for example, propylene glycol, diethyl carbonate, glycerol, sorbitol, etc.; buffering agents, hyaluronidase, local anesthetics and inorganic salts to afford desirable pharmacological properties. These compounds may also be combined with various pharmaceutically-acceptable inert carriers in the form of capsules, tablets, lozenges, troches, dry mixes, suspensions, solutions, elixirs, and parenteral solutions or suspensions. The carriers employed include solid diluents, aqueous vehicles, non-toxic organic solvents and the like. In general, the compounds are present in various dosage forms at concentration levels ranging from about 0.5 percent to about 90 percent by weight of the total composition. Other methods include mixing with the feed the preparation of feed concentrates and supplements. Additionally, dilute solutions or suspensions, e.g., a 0.1 percent solution, can be supplied for drinking purposes.

The addition of a low level of one or more of the herein described N-substituted 3-methyl-2-quinoxalinecarboxamide-di-N-oxides to the diet of healthy animals, both ruminant and non-ruminant, such that these animals receive the product over an extended period of time, at a level of from about 1 mg./kg. to about 100 mg./kg. of body weight per day, especially over a major portion of their active growth period, results in an acceleration of the rate of growth and improved feed efficiency. Included in these two classes of animals are poultry (chickens, ducks, turkeys), cattle, sheep, dogs, cats, swine, rats, mice, horses, goats, mules, rabbits, mink, etc. The beneficial effects in growth rate and feed efficiency are over and above what is normally obtained with complete nutritious diets containing all the nutrients, vitamins, minerals and other factors known to be required for the maximum healthy growth of such animals. The animals thus attain market size sooner and on less feed.

The herein described feed compositions have been found to be particularly valuable and outstanding in the case of swine. In some instances the degree of response may vary with respect to the sex of the animals. The products may, of course, be administered in one component of the feed or they may be blended uniformly throughout a mixed feed; alternatively as noted above, they may be administered in an equivalent amount via the animal's water ration. It should be noted that a variety of feed components may be of use in the nutritionally balanced feeds.

The resulting new feed compositions have marked effects on the rate of growth and feed efficiency (the number of pounds of feed required to produce a pound gain in weight). Any animal feed composition may be prepared to comprise the usual nutritional balance of energy, proteins, minerals and vitamins together with one or more of the quinoxaline-di-N-oxides described above. Some of the various components are commonly grains such as ground grain and grain by-product; animal protein substances, such as meat and fish by-products; vitaminaceous mixtures, e.g., vitamin A and D mixtures, riboflavin supplements and other vitamin B complexes; and bone meal, limestone and other inorganic compounds to provide minerals.

The relative proportions of the present compounds in feeds and feed concentrates may vary somewhat, depending upon the compound, the feed with which they are employed and the animal consuming the same. These substances are advantageously combined in such relative proportions with edible carriers to provide pre-mixes or concentrates which may readily be blended with standard nutritionally balanced feeds or which may be used themselves as an adjunct to normal feedings.

In the preparation of concentrates a wide variety of carriers may be employed containing the aforesaid drugs. Suitable carriers include the following: soybean oil meal, corn gluten meal, cotton seed oil meal, sunflower seed meal, linseed oil meal, cornmeal, limestone and corncob meal. The carrier facilitates uniform distribution of the active materials in the finished feed with which the concentrate is blended. This is especially important because only a small proportion of these potent materials are required. The concentrate may be surface coated, if desired, with various proteinaceous materials or edible waxes, such as zein, gelatin, microcrystalline wax and the like to provide a protective film which seals in the active ingredients. It will be appreciated that the proportions of the drug preparation in such concentrates are capable of wide variation since the amount of active materials in the finished feed may be adjusted by blending the appropriate proportion of concentrate with the feed to obtain the desired degree of supplementation. In the preparation of high potency concentrates, i.e., premixes, suitable for blending by feed manufacturers to produce finished feeds or concentrates of lower potency, the drug content may range from about 0.1 g. to 50 g. per pound of concentrate. A particularly useful concentrate is provided by blending 2 g. of drug with 1 pound of limestone or 1 pound of limestone-soybean oil meal (1:1). Other dietary supplements, such as vitamins, minerals, etc., may be added to the concentrates in the appropriate circumstances.

The high potency concentrates may be blended by the feed manufacturer with proteinaceous carrier, such as soybean oil meal, to produce concentrated supplements which are suitable for direct feeding to animals. In such instances, the animals are permitted to consume the usual diet of corn, barley and other fibrous grains and the like. The proportion of the drug in these supplements may vary from about 0.1 to 10 g. per pound of supplement.

The concentrates described may also be added to animal feeds to produce a nutritionally balanced, finished feed containing from about 5 to about 125 g. of the herein described compounds per ton of finished feed. In the case of ruminants, the finished feed should contain protein, fat, fiber, carbohydrate, vitamins and minerals, each in an amount sufficient to meet the nutritional requirements of the animal for which the feed is intended. Most of these substances are present in naturally occurring feed materials, such as alfalfa hay or meal, cracked corn, whole oats, soybean oil meal, corn silage, ground corn cobs, wheat bran and dried molasses. Bone meal, limestone, iodized salt and trace minerals are frequently added to supply the necessary minerals and urea to provide additional nitrogen.

As is well known to those skilled in the art, the types of diets are extremely variable depending upon the purpose, type of feeding operation, species, etc. Specific diets for various purposes are listed by Morrison in the Appendix of "Feeds and Feeding," the Morrison Publishing Company, Clinton, Iowa, 1959.

In the case of non-ruminant animals, such as hogs, a suitable feed may contain from about 50 to 80 percent of grains, 3 to 10 percent animal protein, 5 to 30 percent vegetable protein, 2 to 4 percent of minerals, together with supplementary vitaminaceous sources.

The following examples are given solely for the purpose of illustration.

EXAMPLE I

N-(2-hydroxyethyl)-3-methyl-2-quinoxalinecarboxamide-di-N-oxide

A solution of 2-hydroxyethylamine (4.58 g., 0.075 mole) in N,N-dimethylformamide (50 ml.) is added to a stirred solution of diketene (4.2 g., 0.05 mole) in ether (30 ml.) at a temperature of 20° C. Benzofuroxan (8.6 g., 0.05 mole) is then dissolved in the reaction mixture with good stirring. The mixture is allowed to stand at room temperature overnight and the product filtered off. Recrystallization from methanol: chloroform (1:1) yields the pure product; M.P. 224° C.

Repetition of this procedure but using 0.05 mole of 2-hydroxyethylamine and 0.025 mole of the following bases in place of 0.075 mole of 2-hydroxyethylamine produces substantially the same results: triethylamine, 1,5 - diazabicyclo-[4.3.0] - 5 - nonene, 1,2 - dimethyl-1,4,5,6-tetrahydropyrimidine, sodium methoxide, alcoholic potassium hydroxide and sodium hydride.

EXAMPLE II

Following the above procedure, the following N-(ω-hydroxyalkyl)-3-methyl - 2 - quinoxalinecarboxamide-di-N-oxides are prepared from the appropriate reactants. Pertinent data are presented below. Despite the fact that the formula shows X and Y at specific locations on the ring, it is understood that their representation in this manner is arbitrary. Whether they are located at the 6- and/or 7-positions is not known with certainty.

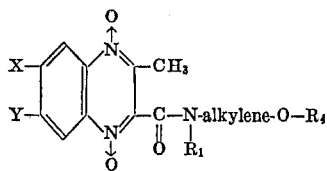

| Y | X | $R_1$ | Alkylene—O—$R_4$ | Reaction solvent [1] | Recrystal solvent [1] | M.P. (° C.) |
|---|---|---|---|---|---|---|
| H | Cl | H | $CH_2CH_2OH$ | DMF/ether | $MeOH/CHCl_3$ | 214 |
| Cl | Cl | H | $CH_2CH_2OH$ | do | $CH_3CO_2H$ | 223 |
| H | H | H | $CH_2CH(CH_3)OH$ | EtOH | $MeOH/CHCl_3$/ether | 196–7 |
| H | H | H | $CH(CH_3)CH_2CH_2OH$ | Same as above | do | 172–3 |
| H | H | $C_2H_5$ | $CH_2CH_2OH$ | do | do | 203–4 |
| H | H | H | $CH(C_2H_5)CH_2OH$ | do | do | 189–90 |
| H | H | H | $CH_2CH_2CH_2OH$ | do | do | 170–1 |
| H | Cl | H | $CH(CH_3)CH_2CH_2OH$ | do | do | 174–5 |
| H | H | H | $C(CH_3)_2CH_2OH$ | do | do | 227–8 |
| H | Cl | H | $CH_2CH(CH_3)OH$ | do | do | 207–8 |
| H | Cl | H | $CH(C_2H_5)CH_2OH$ | do | do | 188–9 |
| H | Cl | H | $CH_2CH_2CH_2OH$ | do | do | 189–90 |
| H | Cl | $CH_3$ | $CH_2CH_2OH$ | do | do | 184–5 |
| H | $OCH_3$ | H | $CH_2CH(CH_3)OH$ | do | do | 215–6 |
| H | $OCH_3$ | H | $CH_2CH_2OH$ | do | do | 193–4 |
| H | $OCH_3$ | $CH_3$ | $CH_2CH_2OH$ | do | $CF_3COOH/MeOH$ | 213–4 |
| H | Cl | H | $C(CH_3)_2CH_2OH$ | do | $MeOH/CHCl_3$/ether | 219–60 |
| H | H | $CH_2CH_2OH$ | $CH_2CH_2OH$ | do | do | 205–6 |
| H | H | $CH_3$ | Same as above | do | do | 181–2 |
| H | Cl | $CH_2CH_2OH$ | do | do | do | 194–5 |
| H | H | H | $CH_2CH_2CH_2CH_2OH$ | do | $MeOH/CHCl_3$ | |
| H | Cl | H | Same as above | do | $MeOH/CHCl_3$/ether | 170–2 |
| H | Cl | $C_2H_5$ | $CH_2CH_2OH$ | do | do | 176–7 |
| H | Cl | H | $CH_2CH_2OCH_3$ | do | do | 188–9 |
| H | H | H | Same as above | do | do | 142–3.5 |

[1] DMF=N,N-dimethylformamide.   EtOH=ethanol.   MeOH=methanol.

EXAMPLE III

The following N-(ω-aminoalkyl) derivatives of 3-methyl-2-quinoxalinecarboxamide-di-N-oxide of Formula I are prepared by the procedure of Example I from appropriate reactants. Pertinent data are given below:

EXAMPLE IV

Similarly, N - carboxyalkyl-3-methyl-2-quinoxalinecarboxamide-di-N-oxides and functional derivatives thereof of Formula III are prepared from the appropriate reactants.

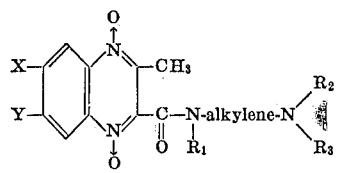

| Y | X | $R_1$ | $R_2$ | Reaction solvent [1] | Recrystal solvent [1] | (° C.) |
|---|---|---|---|---|---|---|
| H | Cl | H | $CH_2CH_2CH_2N(CH_3)_2$ | Ether | Acetone | 115 |
| H | F | H | Same as above | do | EtOAc | 140 |
| H | Cl | H | $CH_2CH_2N(CH_3)_2$ | DMF/ether | EtOH | 156–7 |
| H | H | H | $CH_2CH_2N(C_2H_5)_2$ | Ether | Same as above | 108–50 |
| H | H | H | $CH_2CH_2$-pyrrolidino | do | do | 132–3 |
| H | H | H | $CH_2CH_2$-morpholino | EtOH | do | 157–8 |
| H | F | H | $CH_2CH_2$-piperidino | Shown as above | do | 166–7 |
| H | F | H | $CH_2CH_2$-morpholino | do | $MeOH/CHCl_3$ | 206–7 |
| H | Cl | H | $CH_2CH_2$-piperidino | do | MeOH | 179–80 |
| H | Cl | H | $CH_2CH_2$-morpholino | do | $MeOH/CHCl_3$ | 203–4 |
| H | Cl | H | $CH_2CH(CH_3)N(CH_3)_2$ | Ether | EtOH | 159–60 |
| H | Cl | H | $CH(CH_3)CH_2N(CH_3)_2$ | do | Same as above | 130–5 |
| H | Cl | H | $CH_2CH_2NH_2$ | $HBr/CH_3CO_2H$ | EtOH/MeOH | [2] 223–4 |
| H | F | H | Same as above | Same as above | MeOH | [2] 238–9 |
| H | H | H | $CH_2CH_2NHCOCH_3$ | DMF | $CF_3COOH/EtOH$ | 225 |
| H | Cl | H | Same as above | DMF | $CF_3COOH/MeOH$ | 222 |
| H | Cl | $CH_3$ | $CH_2CH_2N(CH_3)_2$ | Ether | MeOH | 165–6 |
| H | H | H | $CH_2CH_2CH_2N(CH_3)_2$ | do | Acetone/EtOAc | 155–6 |
| H | F | H | Same as above | do | EtOAc | 140 |
| H | H | H | $CH_2CH_2NH_2$ | do | Acetone | 119 |
| H | H | H | Same as above | $HBr/CH_3CO_2H$ | EtOH | [2] 217–8 |
| H | H | H | $CH_2CH_2N(CH_3)_2$ | Ether | Same as above | 118–9 |
| H | H | H | $CH_2CH(CH_3)N(CH_3)_2$ | do | do | 118–21 |

[1] DMF=N,N'-dimethylformamide.   EtOH=ethanol.   EtOAc=ethylacetate.   MeOH=methanol.
[2] Prepared as hydrobromide salt.

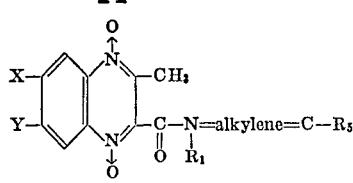

| Y | X | $R_1$ | Alkylene-$COR_5$ | Reaction solvent[1] | Recrystal solvent[1] | M.P. (°C.) |
|---|---|---|---|---|---|---|
| H | Cl | H | $CH_2COOC_2H_5$ | EtOH | EtOH | 200-1 |
| H | Cl | H | $CH_2COOCH_3$ | $CH_3OH$ | $MeOH/CHCl_3$ | 212-3 |
| H | Cl | H | $CH_2COOH$ | $CH_3OH/H_2O$ | Acetone/$H_2O$ | 235-6 |
| H | H | H | Same as above | Same as above | do | 239 |
| H | H | H | $CH_2CONH_2$ | EtOH | $CF_3CO_2H/EtOH$ | 249 |
| H | H | H | $CH_2CONHC_2H_5$ | Same as above | $MeOH/CHCl_3$ | 215-7 |
| H | H | H | $CH_2CONHCH_3$ | do | Same as above | 216-7 |
| H | H | H | $CH_2CONH_2$ | do | do | [2]249 |
| H | H | H | $CH_2COOC_2H_5$ | do | do | 186-7 |
| H | Cl | H | $CH_2CH_2COOCH_3$ | do | MeOH | [2]176-8 |
| H | Cl | H | $CH_2CH_2CONH_2$ | do | $MeOH/CHCl_3$ | [2]210-2 |
| H | H | H | $CH_2CON(CH_3)_2$ | do | Same as above | 200-2 |
| H | H | H | $CH_2CH_2CONH_2$ | MeOH | $CF_3CO_2H/MeOH$ | [2]223-4 |
| H | Cl | H | $CH_2CONH_2$ | EtOH | Same as above | [2]235-6 |
| H | Cl | H | $CH_2CONHCH_3$ | Same as above | $MeOH/CHCl_3$ | 224-5 |
| H | Cl | H | $CH_2CONHC_2H_5$ | do | Same as above | 214-5 |
| H | Cl | H | $CH_2CON(CH_3)_2$ | do | do | [2]224-5 |
| H | Cl | H | $CH_2CH_2CONHCH_3$ | do | $CF_3CO_2H/MeOH$ | [2]218-9 |
| H | Cl | H | $CH_2CH_2CONHC_2H_5$ | do | $MeOH/CHCl_3$ | [2]213-4 |

[1] MeOH = methanol. EtOH = ethanol.
[2] Decomposition.

EXAMPLE V

Utilization of the following general procedure produces the 3-methyl-2-quinoxalinecarboxamide-di-N-oxides listed below. The procedure comprises adding a solution of 1.5 equivalents of the appropriate amine ($HNR_1$-alkylene-Z) in a suitable solvent, usually tetrahydrofuran or N,N-dimethylformamide/ether, to a solution of one equivalent of diketene in ten times its volume of an appropriate solvent at a slow rate at a temperature of about 5° to 15° C. When addition is completed, the solution is stirred for fifteen minutes and then one equivalent of the proper benzofuroxan added. The mixture is thoroughly stirred and allowed to stand overnight. The product is recovered by filtration and purified by recrystallization from an appropriate solvent system.

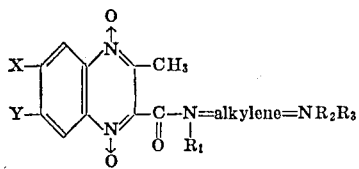

| Y | X | $R_1$ | Alkylene-$NR_2R_3$ |
|---|---|---|---|
| H | F | H | $CH_2CH_2N(CH_3)_2$ |
| H | H | H | $(CH_2)_4N(CH_3)_2$ |
| H | H | H | $CH_2CH_2N(CH_3)_2$ |
| H | $CH_3$ | H | Same as above |
| H | $OCH_3$ | H | Do. |
| H | Cl | $CH_3$ | Do. |
| $CH_3$ | $CH_3$ | H | Do. |
| H | $SO_2NH_2$ | H | Do. |
| H | $SO_2N(CH_3)_2$ | H | Do. |
| H | $CH_3$ | H | $CH_2CH_2CH_2N(CH_3)_2$ |
| $CH_3$ | Cl | H | Same as above |
| H | H | H | $CH_2CH_2N(C_2H_5)_2$ |
| $CH_3O$ | $CH_3$ | H | $CH_2CH_2N(CH_3)_2$ |
| H | $OCH_3$ | H | $(CH_2)_4N(C_2H_5)_2$ |
| H | $SO_2NH_2$ | $CH_3$ | $CH_2CH_2N(CH_3)_2$ |
| H | $SO_2NH_2$ | $C_2H_5$ | Same as above |
| $CH_3$ | Cl | H | Do. |
| H | $SO_2NH_2$ | H | $CH_2CH_2N(i-C_3H_7)_2$ |
| H | H | H | $CH_2CH_2NH(COCH_3)$ |
| H | Cl | H | $CH_2CH_2NH(CHO)$ |
| H | F | H | $CH_2CH_2NH(COC_3H_7)$ |
| H | H | H | $(CH_2)_4N(CH_3)_2$ |
| H | $CH_3$ | H | $CH_2CH_2CH(CH_3)N(CH_3)_2$ |
| H | $CH_3$ | H | Same as above |
| H | Cl | H | $CH_2CH_2CH(CH_3)NHC_2H_5$ |
| $CH_3$ | $CH_3$ | H | $CH_2CH_2N(C_2H_5)_2$ |
| H | Cl | H | $CH_2CH(CH_3)N(CH_3)_2$ |
| $CH_3O$ | Cl | H | $CH_2CH_2N(CH_3)_2$ |
| H | H | $C_2H_5$ | $CH_2CH_2NH(CH_3)$ |
| H | H | $CH_3$ | $CH_2CH_2NH(C_2H_5)$ |
| H | Cl | H | $CH_2CH_2NH(CH_3)$ |
| H | Cl | H | Same as above |
| H | $OCH_3$ | H | Do. |
| H | $SO_2NH_2$ | H | Do. |
| H | H | H | $(CH_2)_4NH(CH_3)$ |
| $CH_3$ | $CH_3$ | H | $CH_2CH_2CH_2NH(CH_3)$ |

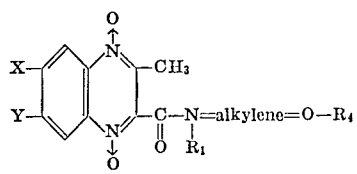

| Y | X | $R_1$ | Alkylene-O-$R_4$ |
|---|---|---|---|
| H | $CH_3$ | H | $CH_2CH_2OH$ |
| H | $CH_3$ | H | $CH_2CH_2CH_2OH$ |
| H | $OCH_3$ | H | $CH_2CH_2OH$ |
| $CH_3$ | $OCH_3$ | H | $CH_2CH_2CH_2OH$ |
| H | $SO_2NH_2$ | H | $CH_2CH_2OH$ |
| H | Same as above | H | $CH_2CH_2CH_2OH$ |
| H | $SO_2N(CH_3)_2$ | H | $CH_2CH_2OH$ |
| H | Same as above | H | $CH_2CH_2CH_2OH$ |
| H | H | $CH_3$ | $CH_2CH_2OH$ |
| H | Cl | $CH_3$ | Same as above |
| H | $OCH_3$ | $C_2H_5$ | Do. |
| $CH_3$ | Cl | $CH_3$ | Do. |
| H | $SO_2NH_2$ | $CH_3$ | Do. |
| H | $SO_2N(CH_3)$ | $CH_3$ | Do. |
| H | H | $C_2H_5$ | Do. |
| H | $OCH_3$ | H | $CH_2CH_2OC_4H_9$ |
| H | H | H | $CH_2CH_2OCH_3$ |
| H | $CH_3$ | H | $CH_2CH_2OCH_3$ |
| H | Cl | $CH_3$ | $CH_2CH_2OC_2H_5$ |
| H | $SO_2NH_2$ | H | $CH_2CH_2OCH_3$ |
| H | F | H | $CH_2CH_2OH$ |
| $CH_3$ | F | H | $CH_2CH_2OCH_3$ |
| $OCH_3$ | F | $CH_3$ | $CH_2CH_2OH$ |
| $CH_3$ | $CH_3$ | $CH_3$ | Same as above |
| H | H | H | $(CH_2)_4OH$ |
| H | H | H | $(CH_2)_4OCH_3$ |
| H | H | H | $CH_2CH(CH_3)OH$ |
| H | H | H | $CH_2CH(OC_2H_5)CH_2OH$ |
| H | H | $CH_3$ | $CH_2CH(CH_3)OH$ |
| $OCH_3$ | Cl | $C_2H_5$ | $CH_2CH_2OH$ |
| H | $OCH_3$ | H | $CH_2CH_2OCOH$ |
| H | H | H | $CH_2CH_2OCOCH_3$ |
| H | Cl | H | $CH_2CH_2OCOC_3H_7$ |
| H | $OCH_3$ | H | $CH_2CH_2CH_2OCOH$ |

| Y | X | $R_1$ | Alkylene-$NR_2R_3$ |
|---|---|---|---|
| H | F | H | $CH_2CH_2NH(C_2H_5)$ |
| $CH_3$ | F | H | $CH_2CH_2N(CH_3)_2$ |
| H | H | H | $CH_2CH_2$-pyrrolo |
| H | H | H | $CH_2CH_2CH_2$-morpholino |
| H | H | H | $CH_2CH_2CH_2$-piperidino |
| H | Cl | H | Do. |
| H | F | H | $CH_2CH_2$-(N-methylpiperazino) |
| H | H | H | $CH_2CH_2$-(N-acetylpiperazino) |
| H | Cl | H | $CH_2CH_2CH_2$-(N-methylpiperazino) |
| H | H | H | $CH_2CH_2$-(N-carbomethoxypiperazino) |
| H | H | H | $CH_2CH_2$-(N-formylpiperazino) |
| H | H | $CH_3$ | $CH_2CH_2CH_2$-morpholino |
| H | Cl | H | $CH_2CH_2$-morpholino |
| H | $OCH_3$ | F | Do. |
| H | $CH_3$ | H | Do. |
| H | F | H | $CH_2CH_2$-(N-carbobutoxypiperazino) |
| H | H | H | $CH_2CH_2$-piperazino |
| H | Cl | H | $CH_2CH_2$-piperazino |

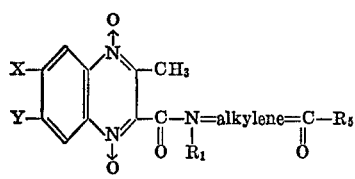

| Y | X | R₁ | Alkylene-COR₅ |
|---|---|---|---|
| H | H | H | CH₂COOCH₃. |
| H | H | H | CH₂COOC₄H₉. |
| H | F | H | CH₂COOCH₃. |
| H | OCH₃ | H | Same as above. |
| H | SO₂NH₂ | H | CH₂COOC₂H₅. |
| H | SO₂N(CH₃)₂ | H | Same as above. |
| H | Cl | CH₃ | Do. |
| H | H | CH₃ | Do. |
| H | H | H | CH₂CH₂COOH. |
| H | Cl | H | Same as above. |
| H | OCH₃ | H | Do. |
| H | SO₂NH₂ | H | Do. |
| H | Cl | H | CH₂CH₂CH₂COOCH₃. |
| H | CH₃ | H | Same as above. |
| H | H | H | (CH₂)₄COOCH₃. |
| H | Cl | H | Same as above. |
| H | CH₃ | H | CH₂CONH₂ |
| H | Cl | H | Same as above. |
| H | SO₂N(CH₃)₂ | H | Same as above. |
| H | H | H | CH₂CH₂CH₂CONH₂. |
| H | Cl | H | Same as above. |
| H | OCH₃ | H | CH₂CONH₂. |
| H | F | H | Same as above. |
| CH₃ | OCH₃ | H | Do. |
| OCH₃ | Cl | H | CH₂CONHCH₃. |
| H | Cl | C₂H₅ | CH₂COOCH₃. |
| CH₃ | Cl | H | CH₂COOC₂H₅. |
| CH₃ | Cl | CH₃ | Same as above. |
| H | F | CH₃ | Do. |
| CH₃ | Cl | H | CH₂CON(CH₃)₂. |
| H | Cl | C₂H₅ | Same as above. |
| CH₃ | Cl | H | CH₂CONHC₂H₅. |
| H | F | H | CH₂CON(C₂H₅)₂. |
| OCH₃ | F | H | CH₂CH₂COOC₂H₅. |
| OCH₃ | F | H | CH₂CH₂CONHCH₃. |
| H | Cl | CH₃ | CH₂CON(CH₃)₂. |
| H | Cl | H | CH₂CH₂CON(C₂H₅)₂. |
| H | CH₃ | H | CH₂CH₂CH₂CONHCH₃. |

EXAMPLE VI

N-(2-N',N'-dimethylaminoethyl)-3-methyl-6(or 7) chloro-2-quinoxalinecarboxamide-di-N-oxide Method B.—A mixture of 5-chlorobenzofuroxan (6.8 g., 0.05 mole), N-(2-N',N'-dimethylaminoethyl)acetoacetamide (8.6 g., 0.05 mole), triethylamine (10 ml.) and tetrahydroduran (200 ml.) is thoroughly stirred then allowed to stand at room temperature overnight. The product which precipitates is removed by filtration and recrystallized from ethanol.

EXAMPLE VII

N-(3-N',N'-dimethylaminopropyl)-3-methyl-2-quinoxalinecarboxamide-di-N-oxide

Method C.—A mixture of the ethyl ester of 3-methyl-2-quinoxalinecarboxylic acid - di - N - oxide (12.4 g., 0.05 mole), N,N-dimethyltrimethylenediamine (10.2 g., 0.10 mole) and ether (200 ml.) is thoroughly stirred and allowed to stand at room temperature for five days. The product which precipitates is collected and recrystallized from acetone-ethyl acetate (1:1).

Method D.—To a solution of N,N'-carbonyldiimidazole (3.2 g., 0.02 mole) in N,N-dimethylformamide (25 ml.) is added 3-methyl-2-quinoxalinecarboxylic acid-di-N-oxide (2.2 g., 0.01 mole). After twenty-four hours a solution of N,N-dimethyltrimethylenediamine (1.0 g., 0.01 mole) in ether (25 ml.) is added and the mixture thoroughly stirred. After standing overnight, the product is filtered off and recrystallized as above.

EXAMPLE VIII

The following compounds are prepared by the procedures of methods B, C or D from the appropriate reactants:

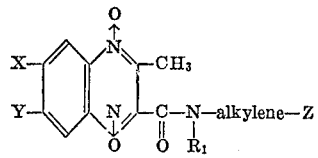

| Y | X | R₁ | Alkylene-Z | Method |
|---|---|---|---|---|
| H | Cl | H | CH₂CH₂CH₂N(CH₃) | D |
| H | Cl | H | CH₂CH₂N(CH₃)₂ | C |
| H | H | H | CH₂CH₂OH | B |
| H | H | H | do | C |
| H | H | H | CH₂CH₃OCH₃ | D |
| H | H | H | CH₂—COOCH₃ | B |
| H | Cl | H | do | B |
| H | SO₂NH₂ | H | do | B |
| H | H | H | CH₂—CONH₂ | C |
| H | SO₂N(CH₃)₂ | H | CH₂CH₂COOC₂H₅ | B |
| CH₃ | Cl | H | CH₂CH₂N(CH₃)₂ | B |
| H | CH₃ | H | CH₂CH₂CH₂OCH₃ | B |
| H | F | H | CH₂CH₂N(CH₃)₂ | B |
| H | H | H | CH₂CON(CH₃)₂ | D |
| H | F | CH₃ | do | D |

EXAMPLE IX

Salt formation

The N-(aminoalkyl)-3-methyl - 2 - quinoxalinecarboxamide-di-N-oxides of Formula II, exemplified in Examples III through VIII are converted to acid addition salts by treatment with an equimolar proportion of the appropriate acid in methanol as solvent. The salts are recovered by precipitation with a non-solvent, e.g., ether, hexane or alternatively, if desired, by evaporation of the solvent. The following acid addition salts are thus prepared: p-toluenesulfonate, pamoate, amsonate, 2-hydroxy-3-naphthoate, stearate, citrate, gluconate, benzoate, acetate, propionate, butyrate, sulfate, nitrate, phosphate, hydrobromide, t-butylacetate, trimethylacetate, oxalate, succinate, malate and tartrate.

EXAMPLE X

Ninety-six pigs (Conner Prairie crossbreed) five to six weeks old are divided into three equal groups (A, B and C). Each group is sub-divided into four sub-groups of eight pigs each (4 females and 4 castrated males) and each sub-group is assigned to a pen. Group A serves as a negative control and is fed only a standard basal ration. The remaining two groups are fed the same basal ration but which has been supplemented with a growth promotant at 20 grams per ton of ration.

Group B—N-[2-(N',N'-dimethylamino)ethyl]-3-methyl-6 (or 7)-chloro-2-quinoxalinecarboxamide-di-N-oxide Group C—N-(2-hydroxyethyl)-3-methyl-6(or 7)-chloro-2-quinoxalinecarboxamide-di-N-oxide The ration formulation has the composition shown and is presented ad libitum as is the water. The supplements are added at the expense of the ground yellow corn.

BASAL RATION

| Ingredients: | Percent |
|---|---|
| Ground yellow corn | 58.15 |
| Soybean meal, 50% protein | 19.60 |
| Alfalfa meal, 17% protein | 2.00 |
| Dried skim milk | 5.00 |
| Dried whey | 10.00 |
| Stabilized animal fat (lard or tallow) | 2.50 |
| Dicalcium phosphate | 1.10 |
| Limestone | 0.60 |
| Iodized salt | 0.50 |
| Vitamin premix | a 0.50 |
| Trace mineral premix | b 0.05 |
| Protein (calculated) | 18.0 |
| Calcium | 0.75 |
| Phosphorus | 0.60 | a Contributed the following levels of vitamins per pound of ration: vitamin A, 2,000 I.U.; vitamin D, 200 I.U.; niacin, 10 mg.; riboflavin, 1.5 mg.; pantothenic acid, 6 mg.; choline chloride, 200 mg.; vitamin B₁₂, 10 mcg.

b Contributed the following levels of trace minerals in parts per million: manganese, 120; iron, 40; copper, 4; iodine, 2.4; cobalt, 0.4; zinc, 100.

The individual pigs are weighed prior to the experiment and at regular intervals throughout the 20-day test. The daily consumption of feed is also measured to permit determination of feed efficiency. Pertinent data are presented below (Tables I and II).

TABLE I.—GROWTH PROMOTION DATA

| Group | Sub-group | Average weight per pen (lbs.) Initial | Average weight per pen (lbs.) Final | Average Gain pen/day | Mean | Index |
|---|---|---|---|---|---|---|
| A | 1 | 18.1 | 33.5 | 0.769 | 0.934 | 100.0 |
|   | 2 | 20.1 | 37.0 | 0.844 | | |
|   | 3 | 22.1 | 42.0 | 0.994 | | |
|   | 4 | 24.5 | 47.1 | 1.128 | | |
| B | 1 | 18.1 | 39.6 | 1.071 | 1.185 | 126.8 |
|   | 2 | 20.1 | 43.2 | 1.153 | | |
|   | 3 | 22.1 | 45.9 | 1.188 | | |
|   | 4 | 24.5 | 51.1 | 1.328 | | |
| C | 1 | 18.2 | 40.5 | 1.116 | 1.172 | 125.5 |
|   | 2 | 20.1 | 42.9 | 1.138 | | |
|   | 3 | 22.1 | 44.4 | 1.116 | | |
|   | 4 | 24.6 | 51.0 | 1.321 | | |

TABLE II.—FEED EFFICIENCY DATA

| Group | Sub-group | Average weight per pen Initial | Average weight per pen Final | Feed Consumption per pen | Feed/gain | Mean | Index |
|---|---|---|---|---|---|---|---|
| A | 1 | 18.1 | 33.5 | 258.8 | 1.102 | 2.135 | 100.0 |
|   | 2 | 20.1 | 37.0 | 292.6 | 2.165 | | |
|   | 3 | 22.1 | 42.0 | 352.3 | 2.212 | | |
|   | 4 | 24.5 | 47.1 | 372.2 | 2.060 | | |
| B | 1 | 18.1 | 39.6 | 329.7 | 1.923 | 1.905 | 112.0 |
|   | 2 | 20.1 | 43.2 | 350.1 | 1.896 | | |
|   | 3 | 22.1 | 45.9 | 351.6 | 1.848 | | |
|   | 4 | 24.5 | 51.1 | 414.8 | 1.952 | | |
| C | 1 | 18.2 | 40.5 | 343.8 | 1.924 | 1.881 | 113.4 |
|   | 2 | 20.1 | 42.9 | 324.0 | 1.779 | | |
|   | 3 | 22.1 | 44.4 | 345.9 | 1.936 | | |
|   | 4 | 24.6 | 51.0 | 398.6 | 1.885 | | |

Supplementation of the basal ration with the above-named compounds thus brings about economically significant gains in growth and feed efficiency.

Similar results are achieved with feeds supplemented at this level with:

N-[2-(N',N'-dimethylamino)ethyl]-3-methyl-2-quinoxalinecarboxamide-di-N-oxide;

N-[2-(N',N'-dimethylamino)-2-methylethyl]-3-methyl-2-quinoxalinecarboxamide-di-N-oxide;

N-(2-hydroxy-2-methylethyl)-3-methyl-2-quinoxalinecarboxamide-di-N-oxide;

N-(2-methoxyethyl)-3-methyl-2-quinoxalinecarboxamide-di-N-oxide;

N-(2-methoxyethyl)-3-methyl-6(or 7)-chloro-2-quinoxalinecarboxamide-di-N-oxide;

N-(2-hydroxyethyl)-N-methyl-3-methyl-6(or 7)-chloro-2-quinoxalinecarboxamide-di-N-oxide.

EXAMPLE XI

Repetition of the procedure of Example X but using the basal ration supplemented at levels of 5, 10, 50, 100, 125, 150 and 200 g./ton of feed also produces significant increase in growth and feed efficiency.

Repetition of the procedure of Example X but using the basal ration supplemented at levels of 5, 10, 50, 100, 125, 150 and 200 g./ton of feed also produces significant increase in growth and feed efficiency.

In like manner, the remaining compounds described herein are found to have a beneficial effect on growth promotion and feed efficiency.

What is claimed is:

1. A compound of the formula

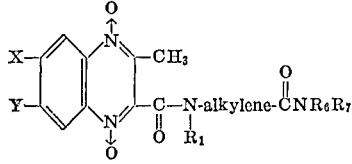

wherein X is selected from the group consisting of hydrogen, chloro, fluoro, methyl and methoxy; Y is selected from the group consisting of hydrogen, methyl and methoxy; $R_1$ is selected from the group consisting of hydrogen, methyl and ethyl; each of $R_6$ and $R_7$ is selected from the group consisting of hydrogen, methyl and ethyl and alkylene is a divalent alkyl radical containing from 1 to 3 carbon atoms.

2. The compound of claim 1 wherein X, Y and $R_1$ are each hydrogen, alkylene is —$CH_2$— and $R_6$ and $R_7$ are each methyl.

3. The compound of claim 1 wherein X is chloro, Y and $R_1$ are each hydrogen, alkylene is —$CH_2$— and $R_6$ and $R_7$ are each hydrogen.

4. The compound of claim 1 wherein X is chloro, Y and $R_1$ are each hydrogen, alkylene is —$CH_2$—, $R_6$ is hydrogen and $R_7$ is methyl.

5. The compound of claim 1 wherein X is chloro, Y and $R_1$ are each hydrogen, alkylene is —$CH_2$— and $R_6$ and $R_7$ are each methyl.

6. The compound of claim 1 wherein X is fluoro, Y and $R_1$ are each hydrogen, alkylene is —$CH_2$— and $R_6$ and $R_7$ are each hydrogen.

References Cited

FOREIGN PATENTS 6504563  10/1965  Netherlands _____ 260—250

NICHOLAS S. RIZZO, Primary Examiner

U.S. Cl. X.R.

260—247.5 R, 268 H, 247.1; 424—250; 99—2 G

PO-1050
(5/69)

UNITED STATES PATENT OFFICE
CERTIFICATE OF CORRECTION

Patent No. __U. S. 3,635,972__ Dated __January 18, 1972__

Inventor(s) __Timothy H. Cronin__

It is certified that error appears in the above-identified patent and that said Letters Patent are hereby corrected as shown below:

column 3, line 15, insert -- III -- to left of middle formula.

column 10, line 17 of the upper Table, under M.P. (° C.), change "219-60" to -- 219-20 --.

column 10, line 4 of the lower Table, under (° C.), change "108-50" to -- 108-10 --.

column 11, that portion of the upper formula reading "$-\underset{\underset{O}{\|}}{C}-\underset{R_1}{N}=alkylene=C-R_5$"

should read -- $-\underset{\underset{O}{\|}}{C}-\underset{R_1}{N}-alkylene-\underset{\underset{O}{\|}}{C}-R_5$ --.

column 11, that portion of the lower formula reading "$-\underset{\underset{O}{\|}}{C}-\underset{R_1}{N}=alkylene=NR_2R_3$"

should read -- $-\underset{\underset{O}{\|}}{C}-\underset{R_1}{N}-alkylene-NR_2R_3$ --.

column 12, that portion of the formula reading "$-\underset{\underset{O}{\|}}{C}-\underset{R_1}{N}=alkylene=O-R_4$"

should read -- $-\underset{\underset{O}{\|}}{C}-\underset{R_1}{N}-alkylene-O-R_4$ --.

column 13, that portion of the formula reading "$-\underset{\underset{O}{\|}}{C}-\underset{R_1}{N}=alkylene=\underset{\underset{O}{\|}}{C}-R_5$"

should read -- $-\underset{\underset{O}{\|}}{C}-\underset{R_1}{N}-alkylene-\underset{\underset{O}{\|}}{C}-R_5$ --.

Signed and sealed this 11th day of July 1972.

(SEAL)
Attest:

EDWARD M. FLETCHER, JR.
Attesting Officer

ROBERT GOTTSCHALK
Commissioner of Patents